(12) United States Patent
Schuetze

(10) Patent No.: US 9,174,596 B2
(45) Date of Patent: Nov. 3, 2015

(54) CONTROL UNIT AND METHOD FOR ACTIVATING OCCUPANT PROTECTION MEANS

(75) Inventor: Norman Schuetze, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1085 days.

(21) Appl. No.: 12/733,151

(22) PCT Filed: Jul. 7, 2008

(86) PCT No.: PCT/EP2008/058783
§ 371 (c)(1),
(2), (4) Date: Apr. 26, 2010

(87) PCT Pub. No.: WO2009/030544
PCT Pub. Date: Mar. 12, 2009

(65) Prior Publication Data
US 2010/0235056 A1   Sep. 16, 2010

(30) Foreign Application Priority Data
Sep. 3, 2007   (DE) .......................... 10 2007 041 847

(51) Int. Cl.
*B60R 21/0132*   (2006.01)
*B60R 21/01*     (2006.01)

(52) U.S. Cl.
CPC ..... *B60R 21/0132* (2013.01); *B60R 2021/0104* (2013.01); *B60R 2021/01054* (2013.01); *B60R 2021/01068* (2013.01); *B60R 2021/01259* (2013.01)

(58) Field of Classification Search
CPC .................. B60R 21/0132; B60R 2021/0104; B60R 2021/01054; B60R 2021/01068; B60R 2021/01259
USPC ......... 701/36, 45–47; 180/232, 271; 280/727, 280/728.1, 734–735
See application file for complete search history.

(56) References Cited

U.S. PATENT DOCUMENTS

| | | | | |
|---|---|---|---|---|
| 3,864,578 | A | * | 2/1975  | Lackey ...................... 307/10.1 |
| 4,410,875 | A | * | 10/1983 | Spies et al. .................... 180/274 |
| 4,511,832 | A | * | 4/1985  | Schmitz ........................ 318/685 |
| 4,638,289 | A | * | 1/1987  | Zottnik ........................... 246/45 |
| 5,081,586 | A | * | 1/1992  | Barthel et al. .................. 701/49 |
| 5,351,185 | A | * | 9/1994  | Takeuchi et al. ................ 700/79 |
| 5,359,515 | A | * | 10/1994 | Weller et al. .................... 701/45 |
| 5,389,822 | A | * | 2/1995  | Hora et al. ................... 307/10.1 |
| 5,412,794 | A | * | 5/1995  | Phoenix et al. ................. 703/21 |
| 5,532,670 | A | * | 7/1996  | Issa et al. ...................... 340/429 |
| 5,602,736 | A | * | 2/1997  | Toya et al. ...................... 701/45 |
| 5,707,117 | A | * | 1/1998  | Hu et al. .................. 303/122.08 |

(Continued)

FOREIGN PATENT DOCUMENTS

| | | |
|---|---|---|
| DE | 101 11 266 | 4/2002 |
| DE | 103 34 235 | 2/2005 |

(Continued)

*Primary Examiner* — John Q Nguyen
*Assistant Examiner* — Michael Ng
(74) *Attorney, Agent, or Firm* — Kenyon & Kenyon LLP

(57) ABSTRACT

A control unit for activating an occupant protection unit includes, at least one analyzer circuit and at least one other component causing the activation. The at least one analyzer circuit transmits a signal to the at least one component as a function of an error event. The at least one other component performs a setting and at least one reset as a function of the signal.

22 Claims, 2 Drawing Sheets

(56) References Cited

U.S. PATENT DOCUMENTS

| | | | |
|---|---|---|---|
| 5,780,782 A * | 7/1998 | O'Dea | 177/136 |
| 5,787,377 A * | 7/1998 | Watanabe et al. | 701/45 |
| 6,212,460 B1 * | 4/2001 | Rizzo et al. | 701/70 |
| 6,595,045 B1 * | 7/2003 | Fuglewicz et al. | 73/129 |
| 6,725,165 B1 * | 4/2004 | Knox et al. | 702/42 |
| 6,859,706 B1 * | 2/2005 | Schmidt | 701/45 |
| 7,263,421 B2 * | 8/2007 | Schou et al. | 701/45 |
| 7,472,000 B2 * | 12/2008 | Steiger | 701/29.7 |
| 2005/0052296 A1 * | 3/2005 | Manlove et al. | 341/110 |
| 2008/0065295 A1 | 3/2008 | Heilmann et al. | |

FOREIGN PATENT DOCUMENTS

| | | |
|---|---|---|
| DE | 10 2004 056 416 | 5/2006 |
| DE | 10 2005 002 721 | 8/2006 |
| RU | 2 271 945 | 11/2005 |
| WO | WO 2004/087468 | 10/2004 |

* cited by examiner

CONTROL UNIT AND METHOD FOR ACTIVATING OCCUPANT PROTECTION MEANS

BACKGROUND OF THE INVENTION

1. Field of the Invention

The present invention relates to a control unit and a method for activating occupant protection means in a vehicle.

2. Description of Related Art

It is known from published German patent document DE 10 2004 056 416 A1 to provide a processor, e.g., a microcontroller in a control unit, and to provide another component, e.g., an acceleration sensor, these components being connected to each other for data transmission. The microcontroller and the acceleration sensor system activate the occupant protection means.

BRIEF SUMMARY OF THE INVENTION

The control unit according to the present invention and the method according to the present invention for activating occupant protection means have the advantage over the related art that the at least one other component performs a setting and at least one reset as a function of the signal, after the analyzer circuit had transmitted the signal to the at least one component as a function of an event. It is thus advantageously possible to provide components such as sensors which have no reset input themselves but may still be reset according to the present invention. The function of power-up reset which is contained in the at least one other component and is linked to another setting is used for this purpose, for example, so that the signal is linked to this power-up reset by the activation of the other setting. The at least one other component may thus be caused to be reset via an appropriate signal in an initialization phase without the presence of a separate reset input being required.

The present invention makes use of the feature of some electrical devices that, if a setting is performed, a reset is indicated to bring the electrical device with its new setting into a defined state. In the present case, this setting may already have occurred, but it is performed again for the purpose of reset in the event of an error.

The alternative of switching off the voltage supply is not possible in all cases in the event of malfunctions of the control unit. However, according to the present invention all cases may be covered where the analyzer circuit, for example, a microcontroller, triggers a reset in all components in the control unit without the voltage supply being switched off.

This makes it possible to trigger a reset at the at least one component in running operation of the control unit without additional hardware complexity. In addition, the reset should be generatable without additional new software architecture in the control unit. Furthermore, reset is always advantageously triggered promptly in connection with the reset of the remaining components, usually via the low level on a reset line. This is particularly important, since after a restart of the microcontroller, all components are subjected to certain tests and program routines.

The present invention advantageously makes it possible for the at least one component to have different predefined communication protocols, for example, and thus to be suitable for different manufacturers. For example, the protocol is selected via an SPI command, this SPI command being understood by all protocols. However, as long as no SPI protocol has been selected, all other SPI commands are ignored by the at least one component for safety reasons. This defines a fixed sequence in initializing the at least one component using the software in the analyzer circuit.

Furthermore, the present invention makes it unnecessary for the software to differentiate between two program routines for initialization as a function of the previous operating state of the control unit.

According to the present invention, the signal is linked to an internal reset in the at least one component. Since certain command sequences must always be observed by the software for initializing or programming the at least one component, this may be implemented in a simple manner according to the present invention.

The protocol must always be selected at the beginning, i.e., prior to selecting the gain. The command is also used for selecting the "language" which is needed for further communication of the component with the system.

A control unit in this case is an electrical device which processes sensor signals and deploys occupant protection means such as airbags, seatbelt tensioners, or brakes or an electronic stability program as a function thereof. Deployment here means activation of these occupant protection means.

The analyzer circuit is normally a processor, for example, a microcontroller; however, it may also be an ASIC or a combination of several integrated circuits or of discrete components. A multicomputer system or a dual core system is also possible here.

The at least one other component is a component located in the control unit and also contributes to activating the occupant protection means. Examples are described in the dependent claims.

The signal is usually a software command such as an SPI command; the signal may, however, also be a multiplex of signals. The signal may also have simpler structures than does a software command.

The event may be brought about by a variety of errors, for example, which include, for example, errors in the analyzer circuit or in other components of the control unit.

Other possible reasons for this event include:
undervoltage of the microcontroller (monitoring in the microcontroller itself),
supply voltages of the components outside the permissible range,
safety monitoring (watchdog),
the software itself must perform a reset (e.g., diagnosis mode/start of the boot loader in the microcontroller after software update),
client request (reset request, for example, via CAN to be able to reset all control units).

Setting is understood here as establishing at least one parameter of the at least one component. The at least one reset is understood as a restart, which brings the at least one component into a defined state. The reset is needed if the analyzer circuit detects an error and wishes to correct it via the reset.

It is advantageous that the at least one component is a sensor system, in particular an acceleration sensor system. This makes it possible to provide such an acceleration sensor system without a reset pin because it is possible according to the present invention to generate the sensor system reset via a signal. Instead of an acceleration sensor system, a structure-borne noise sensor system and/or a yaw sensor system may also be used. Other sensor systems are also possible.

It is furthermore advantageous that the signal, which is also an SPI command, for example, causes a gain to be set. A selection from four gain ranges, for example, may be possible. The reset is included in programming the gain in order to bring the sensor back to a defined state. No new SPI command needs to be created, but an existing command, namely for setting the gain, may be used and set at the beginning of the initialization. The gain refers to the amplification of the acceleration signal generated by the acceleration sensor system.

It is furthermore advantageous that the selected gain range is fixedly stored, so that this previously transmitted gain information is not lost again due to the subsequent desired reset. In particular, the digital logic is locked in the at least one component in order to prevent further accesses by the software.

Locking corresponds to "write protection." By transmitting the SPI command, i.e., the signal, for setting the gain range, the desired gain range is "frozen" for the subsequent reset. Overwriting is not possible until the SPI command is retransmitted after the reset, in which case a reset would subsequently be triggered again.

It may be provided that the SPI command or the signal has to be transmitted twice consecutively. This is required in particular for safety reasons. Any errors on the SPI bus, which would accidentally reset the at least one component in operation although there was no error in the control unit, are thus caught. This double transmission of the SPI command or signal only results in doubling of the time for triggering the reset in the at least one component.

The component or the sensor is developed in such a way that the number and the sequence of the SPI command or signal for generating the reset and, at the same time, setting the gain are monitored internally. The command or the signal must be transmitted twice consecutively. As soon as another SPI command or signal is transmitted after the first transmission of the SPI command or signal, the reset sequence and the setting of gain already begun would be interrupted. However, if the number and sequence are preserved, in this case the gain range which is desired again in this case is saved and subsequently a reset is performed.

DETAILED DESCRIPTION OF THE INVENTION

Figure 1:
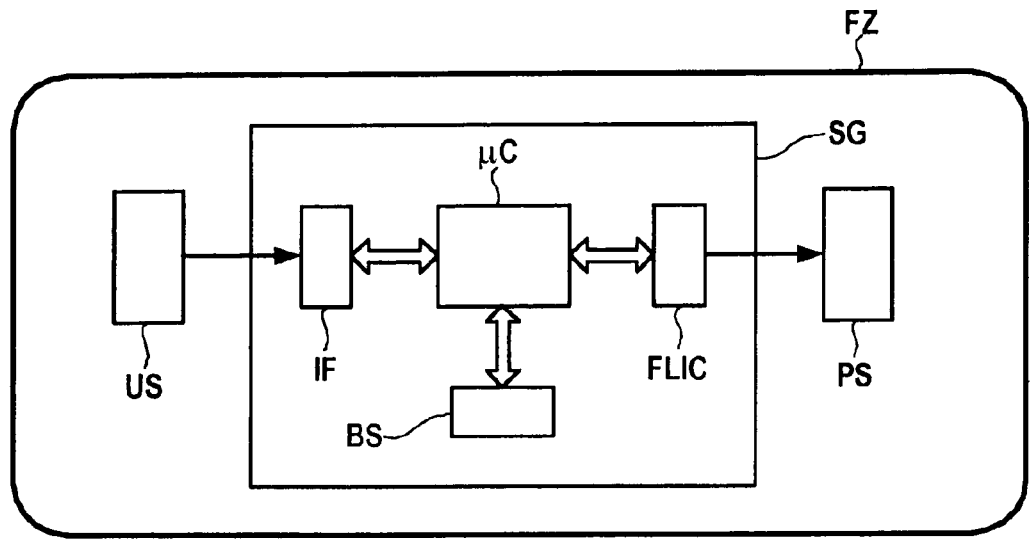
FIG. 1 shows a block diagram of the control unit according to the present invention having connected components in a vehicle.

FIG. 1 shows, in a block diagram, control unit SG according to the present invention in a vehicle FZ having connected components US and PS. This figure is simplified and focuses on the present invention. Crash sensor system US, which is located outside the control unit, for example, structure-borne noise sensors, surroundings sensors, acceleration sensors and/or air pressure sensors, transmit their signals to an interface IF in control unit SG. This interface is designed in this case as an integrated circuit. It is possible for the interface to be part of another integrated circuit or to be present, for example, as a software interface. Interface IF relays these signals to microcontroller µC from the analyzer circuit. Microcontroller µC also receives sensor signals from acceleration sensor system BS. Microcontroller µC analyzes the sensor signals using analyzing algorithms in order to determine whether or not occupant protection means PS are to be activated. If this is the case, microcontroller µC transmits appropriate signals to trigger circuit FLIC which contains electrically controllable power switches, which are closed as a function of these signals in order to cause the occupant protection means and, for example, the ignition elements, to be energized.

It is provided according to the present invention that microcontroller µC causes a reset of acceleration sensor system BS in an initializing phase by transmitting an SPI command as a signal to acceleration sensor system BS so that acceleration sensor system BS may be initialized. For this purpose, microcontroller µC transmits to acceleration sensor system BS a command which causes a setting and also the internal reset of acceleration sensor system BS, which it has anyway for the initialization process. The setting may be, for example, the selection of the gain range. However, other suitable commands are also possible if they are associated with the internal reset of acceleration sensor system BS.

In addition to an acceleration sensor system, other components may also be reset in this way.

Figure 2:
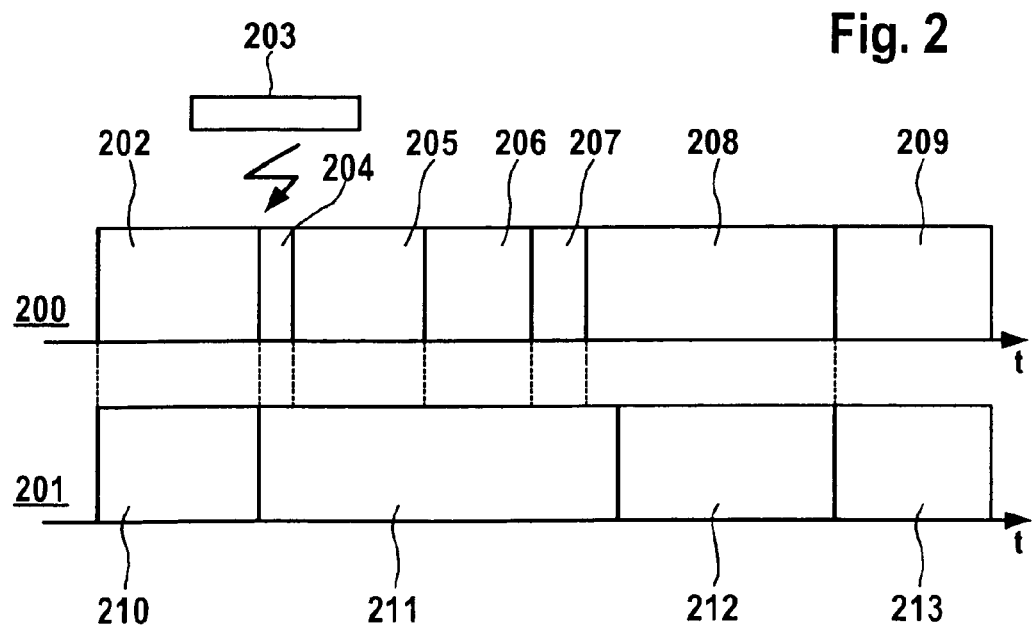
FIG. 2 shows a time sequence diagram.

FIG. 2 shows a time sequence diagram to elucidate the present invention. It is used in particular for elucidating the method according to the present invention. The first line shows a standard system having a reset line, labeled using the reference numeral 200, and in the second line the system according to the present invention is shown without a reset line. The second line is labeled using the reference numeral 201. In the first line, in block 202, the control unit is kept in operation, an internal error event 203 occurring at point in time 204. This error event is an exemplary form of the event. Subsequently in block 205 a lower level is applied via the reset lines to reset the components via this reset line. In block 206 microcontroller 200 resets itself. The operation of microcontroller µC thus starts in block 207; in block 208 it is characterized by the execution of the program code. The initialization of all components is thus achieved. In block 209 the control unit is in normal operation again.

The method according to the present invention is now described for line 201. In block 210, the sensor is in normal operation. Error event 203 occurs again. In block 211 the sensor waits for SPI commands. It outputs no data and is actively at rest.

The sensor itself is a passively communicating element. It is used in the control unit in a master-slave communication system; it can only be configured as a slave. The sensor may send messages via the SPI bus only if it is simultaneously activated/requested by the microcontroller (master) to do so. This takes place via SPI commands which cause the appropriate action or response in the sensor. As long as the microcontroller itself is in reset or no legal commands are transmitted to the sensor, the sensor is in the passive mode. It is in operation, but delivers no information back to the system.

In block 212 sensor initialization begins by microcontroller µC transmitting the command Select_G_Range to the sensor. This causes a reset to be triggered in the sensor and thus the sensor to be initialized. In block 213 the control unit and the sensor are then in normal operation again.

Figure 3:
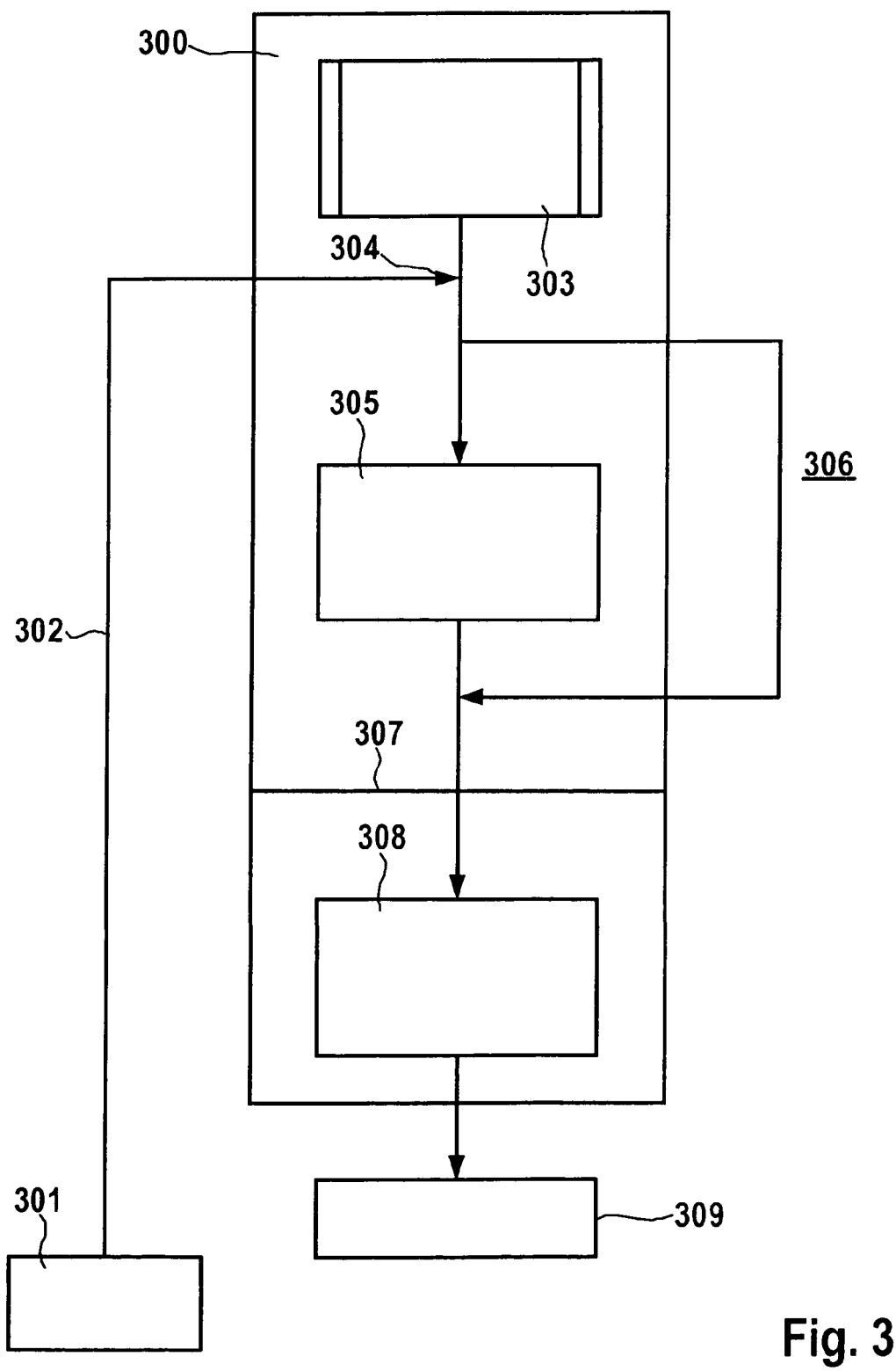
FIG. 3 shows a flow chart of the method according to the present invention.

FIG. 3 shows the method according to the present invention with reference to a flow chart. Block 300 shows the actions of the sensor. The power-on function is executed via the cold start in block 303. In operation, warm start 301 is executed, i.e., re-initialization is performed because the control unit has detected an error. For this purpose, an SPI programming command 302 is transmitted to sensor 300. This programming command 304 in sensor 300 causes, in method step 305, the protocol to be selected and the sensor to be software-locked. The protocol cannot be modified until the next power-on. However, if the protocol has already been selected, 305 is bypassed by 306. In block 307 sensor initialization begins; it is characterized in block 308 by transmitting the Select_

G_Range command twice from the microcontroller to the sensor. The sensor then performs the internal reset while the gain range remains stored. Sensor initialization then begins in method step 309.

What is claimed is:

1. A control unit for activating an occupant protection unit for a vehicle, comprising:
    at least one analyzer circuit; and
    at least one other component operationally linked to the analyzer circuit;
    wherein the analyzer circuit selectively triggers activation of the occupant protect unit with the aid of the at least one component, the analyzer circuit being configured to transmit a signal to the at least one other component as a function of an event,
    wherein the at least one other component is configured to perform a setting and at least one resetting as a function of the signal, and the setting is a function other than resetting, and
    wherein the occupant protection unit is activated without using dedicated resetting circuitry.

2. The control unit as recited in claim 1, wherein the at least one other component is a sensor system.

3. The control unit as recited in claim 2, wherein the signal causes a gain to be set.

4. The control unit as recited claim 3, wherein an SPI bus is provided for transmission.

5. The control unit as recited in claim 1, wherein the component is a sensor arrangement that is a passively communicating element, which is used in the control unit in a master-slave communication system and which is only configurable as a slave, wherein a microcontroller is a master, wherein the sensor arrangement sends a message via an SPI bus only if it is simultaneously activated/requested by the microcontroller to do so via an SPI command which causes an appropriate action or response in the sensor arrangement, wherein sensor initialization begins when the microcontroller transmits a select range command to the sensor arrangement so as to cause a reset to be triggered in the sensor arrangement to initialize the sensor arrangement.

6. The control unit as recited in claim 5, wherein the SPI command for the sensor arrangement causes a protocol to be selected and the sensor arrangement to be software-locked, so that the protocol cannot be modified until a next power-on, and wherein if the protocol has already been selected, sensor initialization begins by transmitting the select range command from the microcontroller to the sensor arrangement, so that the sensor arrangement then performs the internal reset while a gain range remains stored and sensor initialization then begins.

7. The control unit as recited in claim 1, wherein the at least one other component is a sensor system, wherein the signal causes a gain to be set, wherein an SPI bus is provided for transmission, wherein one of four gain ranges is selected as a function of the signal, wherein at least one reset of the at least one component is subsequently performed, the selected gain range being saved and the at least one component being software-locked, wherein the signal is an SPI command, and wherein the signal is transmitted twice, and wherein a protocol is analyzed as a function of the signal.

8. The control unit as recited in claim 1, wherein the signal includes sensor signals from an acceleration sensor system, wherein the sensor signals are transmitted to an interface in the control unit, wherein the interface relays the sensor signals to a microcontroller from the analyzer circuit, wherein the microcontroller also receives sensor signals from an acceleration sensor system, and wherein the microcontroller causes a reset of the acceleration sensor system in an initializing phase by transmitting an SPI command as a signal to the acceleration sensor system so as to initialize the acceleration sensor system.

9. A method for operating a control system for an occupant protection unit for a vehicle, comprising:
    providing at least one analyzer circuit and at least one other component operationally linked to the analyzer circuit, wherein the analyzer circuit selectively triggers activation of the occupant protect unit with the aid of the at least one component;
    transmitting a signal from the at least one analyzer circuit to the at least one component as a function of an event; and
    performing by the at least one other component a setting and at least one resetting as a function of the signal;
    wherein the setting is a function other than resetting, and
    wherein the occupant protection unit is activated without using dedicated resetting circuitry.

10. The method as recited in claim 9, wherein the signal causes a gain to be set.

11. The method as recited in claim 10, wherein one of four gain ranges is selected as a function of the signal, and wherein at least one reset of the at least one component is subsequently performed, the selected gain range being saved and the at least one component being software-locked.

12. The method as recited in claim 11, wherein the signal is an SPI command.

13. The method as recited in claim 12, wherein the signal is transmitted twice.

14. The method as recited in claim 12, wherein a protocol is analyzed as a function of the signal.

15. The method as recited in claim 12, wherein the signal is transmitted twice, and wherein a protocol is analyzed as a function of the signal.

16. The method as recited in claim 10, wherein the signal is transmitted twice.

17. The method as recited in claim 10, wherein a protocol is analyzed as a function of the signal.

18. The method as recited in claim 10, wherein the signal is transmitted twice, and wherein a protocol is analyzed as a function of the signal.

19. The method as recited in claim 9, wherein the component is a sensor arrangement that is a passively communicating element, which is used in the control unit in a master-slave communication system and which is only configurable as a slave, wherein a microcontroller is a master, wherein the sensor arrangement sends a message via an SPI bus only if it is simultaneously activated/requested by the microcontroller to do so via an SPI command which causes an appropriate action or response in the sensor arrangement, wherein sensor initialization begins when the microcontroller transmits a select range command to the sensor arrangement so as to cause a reset to be triggered in the sensor arrangement to initialize the sensor arrangement.

20. The method as recited in claim 19, wherein the SPI command for the sensor arrangement causes a protocol to be selected and the sensor arrangement to be software-locked, so that the protocol cannot be modified until a next power-on, and wherein if the protocol has already been selected, sensor initialization begins by transmitting the select range command from the microcontroller to the sensor arrangement, so that the sensor arrangement then performs the internal reset while a gain range remains stored and sensor initialization then begins.

21. The method as recited in claim 9, wherein the at least one other component is a sensor system, wherein the signal causes a gain to be set, wherein an SPI bus is provided for transmission, wherein one of four gain ranges is selected as a function of the signal, wherein at least one reset of the at least one component is subsequently performed, the selected gain range being saved and the at least one component being software-locked, wherein the signal is an SPI command, and wherein the signal is transmitted twice, and wherein a protocol is analyzed as a function of the signal.

22. The method as recited in claim 9, wherein the signal includes sensor signals from an acceleration sensor system, wherein the sensor signals are transmitted to an interface in the control unit, wherein the interface relays the sensor signals to a microcontroller from the analyzer circuit, wherein the microcontroller also receives sensor signals from an acceleration sensor system, and wherein the microcontroller causes a reset of the acceleration sensor system in an initializing phase by transmitting an SPI command as a signal to the acceleration sensor system so as to initialize the acceleration sensor system.

\* \* \* \* \*